(12) United States Patent
Feldman

(10) Patent No.: US 7,729,051 B2
(45) Date of Patent: *Jun. 1, 2010

(54) METHOD OF MAKING AN OPTICAL SYSTEM

(75) Inventor: Michael R. Feldman, Huntersville, NC (US)

(73) Assignee: Tessera North America, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/222,154

(22) Filed: Aug. 4, 2008

(65) Prior Publication Data

US 2008/0310023 A1 Dec. 18, 2008

Related U.S. Application Data

(62) Division of application No. 11/647,399, filed on Dec. 29, 2006, now Pat. No. 7,408,724, which is a division of application No. 10/949,802, filed on Sep. 27, 2004, now Pat. No. 7,158,303.

(60) Provisional application No. 60/608,375, filed on Sep. 10, 2004.

(51) Int. Cl.
*G02B 5/18* (2006.01)
*G02B 27/44* (2006.01)

(52) U.S. Cl. .................. 359/568; 359/722; 369/112.08

(58) Field of Classification Search ................ 359/722, 359/724, 566, 569, 571, 900, 568; 385/14; 369/112.04, 112.05, 112.06, 112.08
See application file for complete search history.

(56) References Cited

U.S. PATENT DOCUMENTS

| | | | |
|---|---|---|---|
| 6,426,829 B1 | 7/2002 | Feldman et al. | |
| 6,687,037 B2 | 2/2004 | Hendriks et al. | |
| 6,707,608 B1 | 3/2004 | Arieli et al. | |
| 6,987,615 B2 | 1/2006 | Shiono et al. | |
| 7,034,866 B1 | 4/2006 | Colmenarez et al. | |
| 2003/0067686 A1 | 4/2003 | Shiono et al. | |
| 2005/0152258 A1 | 7/2005 | Komma et al. | |
| 2005/0237900 A1 | 10/2005 | Sano et al. | |

(Continued)

FOREIGN PATENT DOCUMENTS

EP 0 747 893 12/1996

(Continued)

OTHER PUBLICATIONS

Arieli, Yoel, et al., "Design of diffractive optical elements for multiple wavelengths", Applied Optics, vol. 37, No. 26, pp. 6174-6177 (Sep. 10, 1998).

(Continued)

*Primary Examiner*—Alessandro Amari
(74) *Attorney, Agent, or Firm*—Lee & Morse, P.C.

(57) ABSTRACT

A method of making a plurality of micro-optical systems includes providing a plurality of diffractive optical elements and aligning each diffractive optical element with a refractive optical element. Each micro-optical system includes a refractive optical element and a diffractive optical element. The diffractive optical element provides different focal lengths at three different wavelengths for each micro-optical system and includes adjacent steps within a cycle having a difference of more the $2\pi$ for at least one of the three different wavelengths.

21 Claims, 2 Drawing Sheets

U.S. PATENT DOCUMENTS

2006/0044450 A1    3/2006    Wolterink et al.

FOREIGN PATENT DOCUMENTS

| EP | 1 148 355 | 10/2001 |
| EP | 1 500 956 | 1/2005 |
| WO | WO 03/024090 A1 | 3/2003 |
| WO | WO 03/075267 | 9/2003 |
| WO | WO 03/091764 | 11/2003 |
| WO | WO 2005/041561 | 5/2005 |

OTHER PUBLICATIONS

Park, et al., "Blu-ray Disc/DVD/CD Compatible Pickup Having a Single Objective Lens and SA Detection . . . ", OSA Topical Meeting, Optical Data Storage, (Postdeadline Papers), pp. 21-23, (May 2003).

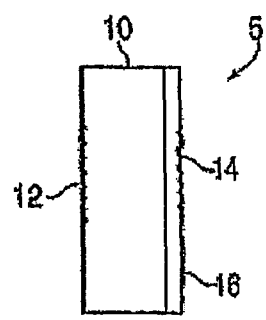
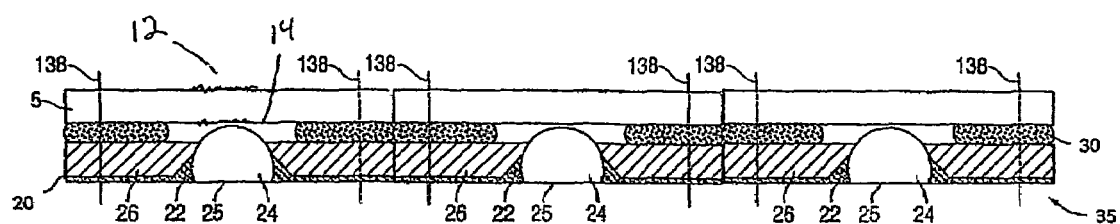

METHOD OF MAKING AN OPTICAL SYSTEM

CROSS REFERENCE TO RELATED APPLICATIONS

This is a divisional application based on application Ser. No. 11/647,399, filed Dec. 29, 2006, now U.S. Pat. No. 7,408, 724 which in turn is a division of application Ser. No. 10/949, 802, filed Sep. 27, 2004, now U.S. Pat. No. 7,158,303 B2, which claims the benefit of provisional application Ser. No. 60/608,375, filed Sep. 10, 2004, the entire contents of all of which is hereby incorporated by reference.

BACKGROUND OF THE INVENTION

1. Field of the Invention

The present invention is directed to a chromatic diffractive optical element (DOE) corrector. More particularly, the present invention is directed to a DOE corrector formed on two surfaces for use with multiple wavelengths.

2. Description of Related Art

Numerous applications require a single objective lens to be used for multiple wavelengths. In many such cases, there are three wavelengths for which the lens is to be used. For example, in blue laser based digital video disc (DVD) systems, it is desirable that these systems remain backwards compatible with red laser DVD systems and compact disc (CD) systems, which use infrared (IR) lasers. Each different color may require different focal lengths and/or different numerical apertures.

One conventional solution includes using one surface having a first phase function providing a high first order efficiency for red and a second phase function providing a high first order efficiency for IR, while providing high zeroth order efficiency for blue. In order to achieve this, a thick DOE needs to be used. For example, to make phase levels that are multiples of $2\pi$ for the blue wavelength, the phase delay for a transmission DOE is given by:

$$2\pi(n-1)d/\lambda \qquad (1)$$

where n is the index of refraction of the DOE for blue light, d is the thickness of the DOE and lambda is the wavelength of the blue light. The $2\pi$ thickness D for each wavelength and corresponding refractive index is given by:

$$D=\lambda/(n-1) \qquad (2)$$

Thus, for example, if a DOE is designed to transmit 407 nm (blue light), impart the first phase function on 650 nm (red light) and impart the second phase function on 785 nm (IR), since 785 nm is nearly twice 407 nm, levels which effect 785 nm but would not effect 407 nm need to be determined. The phase levels would be determined from integer multiples M of D that do not effect the blue light. For most materials this results in very thick elements with relatively low efficiency, especially in the IR, e.g., less than 50%.

In this current solution using one surface to diffract two of the three wavelengths, phase levels for a first phase function at a first wavelength, e.g., 650 nm, are selected that correspond to a zero phase delay (modulo $2\pi$) or about zero phase delay for the other two wavelengths, e.g., 407 nm and 785 nm. For a second phase function at a second wavelength, e.g., 785 nm, phase levels are chosen to correspond to zero for the other two wavelengths, e.g., 407 nm and 650 nm. Assume the phase levels are provided in a material having no dispersion and a refractive index of 1.46. For simplification, consider only solutions MD for blue light. In designing the second phase function and restricting the multiple of D to M≦40, and then looking for values of M within this range where the phase angle for the red light is less than ±20°, then there are five values for M which satisfy this condition. However, these phase levels also need to provide phase angles close to 0°, 90°, 180° and 270° for a four phase level diffractive for the IR light. Only three of the five values are within ±2020 of these target values. A diffractive other than a binary diffractive would thus need to be made with more than a thickness of M=40 at 407 nm, i.e., more than 35 microns thick.

The actual is problem is even more severe than in this simplified case, since the refractive index of fused silica actually decreases as wavelength increases, i.e., positive dispersion. Thus, the refractive index of fused silica is actually 1.470 at 405 nm, 1.457 at 650 nm, and 1.453 (at 785 nm). This dispersion results in the blue and IR light becoming even more closely harmonic, as can be seen with reference to the following phase delay ratio of Equation (3):

$$\frac{\frac{\lambda_B}{(n_B-1)}}{\frac{\lambda_{IR}}{(n_{IR}-1)}} \qquad (3)$$

Without dispersion, i.e., when $n_B=n_{IR}$, this phase delay ratio is 1.93, while in fused silica, it becomes 2.01. With these refractive indices, when M is selected to be an integer for the blue light, then phase values for the IR light will all be within ±10° of either 0° or 180° for all values of M<75, resulting in a DOE having a thickness of at least 65 microns to realize even a four level DOE.

Thus, when using fused silica, the conventional approach is limited to a binary DOE for IR light, unless a very thick diffractive structure, e.g., much thicker than 65 microns, is used. Such a binary DOE has very low efficiency, roughly 40%, compared with roughly 80% for a four-level DOE. Thicker DOEs are a problem, as they are more difficult to fabricate, and generally don't perform as well due to shadowing. Shadowing is due to the relative aspect ratios of the etch depth and the period. For manufacturability, this aspect ratio should be less than about two, and the etch depth should less than about 35 microns. Materials other than fused silica, such as plastic, have been used, as these materials have a larger dispersion than for fused silica, allowing the phase delay ratio to exceed 2.0 and move further from the harmonic. However, in these higher dispersion materials, the proper operation of the first phase function for the red light becomes a problem, especially while achieving proper operation of the second phase function.

SUMMARY OF THE INVENTION

The present invention is therefore directed to a DOE corrector, which substantially overcomes one or more of the problems due to the limitations and disadvantages of the related art.

It is a feature of the present invention to provide a DOE corrector on two surfaces.

It is another feature of the present invention having a high efficiency in a first order for two wavelengths and a high efficiency in the zero order for a third wavelength.

It is yet another feature of the present invention to provide a thinner DOE corrector.

It is still another feature of the present invention to provide a DOE corrector having multiple levels.

At least one of the above and other features and advantages of the present invention may be realized by providing a diffractive optical element (DOE) corrector for use with three different wavelengths, a first diffractive element on a first surface of a first material, the first diffractive element diffracting a first wavelength of the three wavelengths, while directing a majority of light of second and third wavelengths of the three wavelengths into a zero-th order, and a second diffractive element on a second surface of a second material, the second material being different from the first material, the second surface being different from and in an optical path of the first surface, the second diffractive element diffracting the second wavelength, while directing a majority of light of the first and third wavelengths into a zero-th order.

Each of the first and second diffractive elements may include a difference between phase levels of more than $2\pi$ for at least one of the three different wavelengths. The second and third wavelengths may have a substantially harmonic relationship, the second and third wavelengths being more harmonic in the first material and less harmonic in the second material. A phase delay ratio between the second and third wavelengths in the second material may be less than about 1.95 or greater than about 2.05. A phase delay ratio between the second and third wavelengths in the first material may be between about 1.95 and about 2.05. The second material may be provided directly on the first material. The second material may be secured to the first material. The second material may be more dispersive than the first material.

At least one of the above and other features and advantages of the present invention may be realized by providing an optical system, including a refractive optical element, and a diffractive optical element (DOE) corrector for use with three different wavelengths and aligned with the refractive optical element, the DOE corrector including a first diffractive element on a first surface of a first material, the first diffractive element diffracting a first wavelength of the three wavelengths, while directing a majority of light of second and third wavelengths of the three wavelengths into a zero-th order, and a second diffractive element on a second surface of a second material, the second material being different from the first material, the second surface being different from and in an optical path of the first surface, the second diffractive element diffracting the second wavelength, while directing a majority of light of the first and third wavelengths into a zero-th order.

Each of the first and second diffractive elements may include a difference between phase levels of more than $2\pi$ for at least one of the three different wavelengths. The refractive optical element may be received in a hole in a substrate. At least one of the first material, the second material and the substrate are secured together. The first material and the second material may be secured together. The second material may be more dispersive than the first material. The second and third wavelengths may have a substantially harmonic relationship, the second and third wavelengths being more harmonic in the first material and less harmonic in the second material.

At least one of the above and other features and advantages of the present invention may be realized by providing a method of creating a diffractive optical element (DOE) corrector for use with three different wavelengths, including forming a first diffractive element on a first surface of a first material, the first diffractive element diffracting a first wavelength of the three wavelengths, while directing a majority of light of second and third wavelengths of the three wavelengths into a zero-th order, and forming a second diffractive element on a second surface of a second material, the second material being different from the first material, the second surface being different from and in an optical path of the first surface, the second diffractive element diffracting the second wavelength, while directing a majority of light of the first and third wavelengths into a zero-th order.

The first material may be selected to have a harmonic phase delay ratio and the second material may be selected to have a non-harmonic phase delay ratio. The first material may be selected to have a first chromatic dispersion and the second material may be selected to have a second chromatic dispersion, the second chromatic dispersion being greater than the first chromatic dispersion. Two of the three wavelengths may be substantially harmonics of one another when there is no dispersion. The first and second materials may be secured to one another.

At least one of the above and other features and advantages of the present invention may be realized by providing a plurality of integrated micro-optical system, including a first wafer having a plurality of holes therein, an approximately spherical lens inserted each hole, a second wafer including a plurality of diffractive optical elements, each diffractive optical element aligned with each approximately spherical lens, the first and second wafers being secured together, each micro-optical system including an approximately spherical lens in a hole and a diffractive optical element.

A single integrated micro-optical system may be separated from the plurality of micro-optical systems. The diffractive optical element may correct for chromatic dispersion of the micro-optical element.

BRIEF DESCRIPTION OF THE DRAWINGS

The above and other features and advantages of the present invention will become readily apparent to those of skill in the art by describing in detail embodiments thereof with reference to the attached drawings, in which FIG. 1 is a schematic side view of a DOE corrector in accordance with an embodiment of the present invention;

FIG. 3 is a schematic side view of a DOE corrector of FIG. 1 aligned with lens to be corrected.

DETAILED DESCRIPTION OF THE INVENTION

Figure 2:
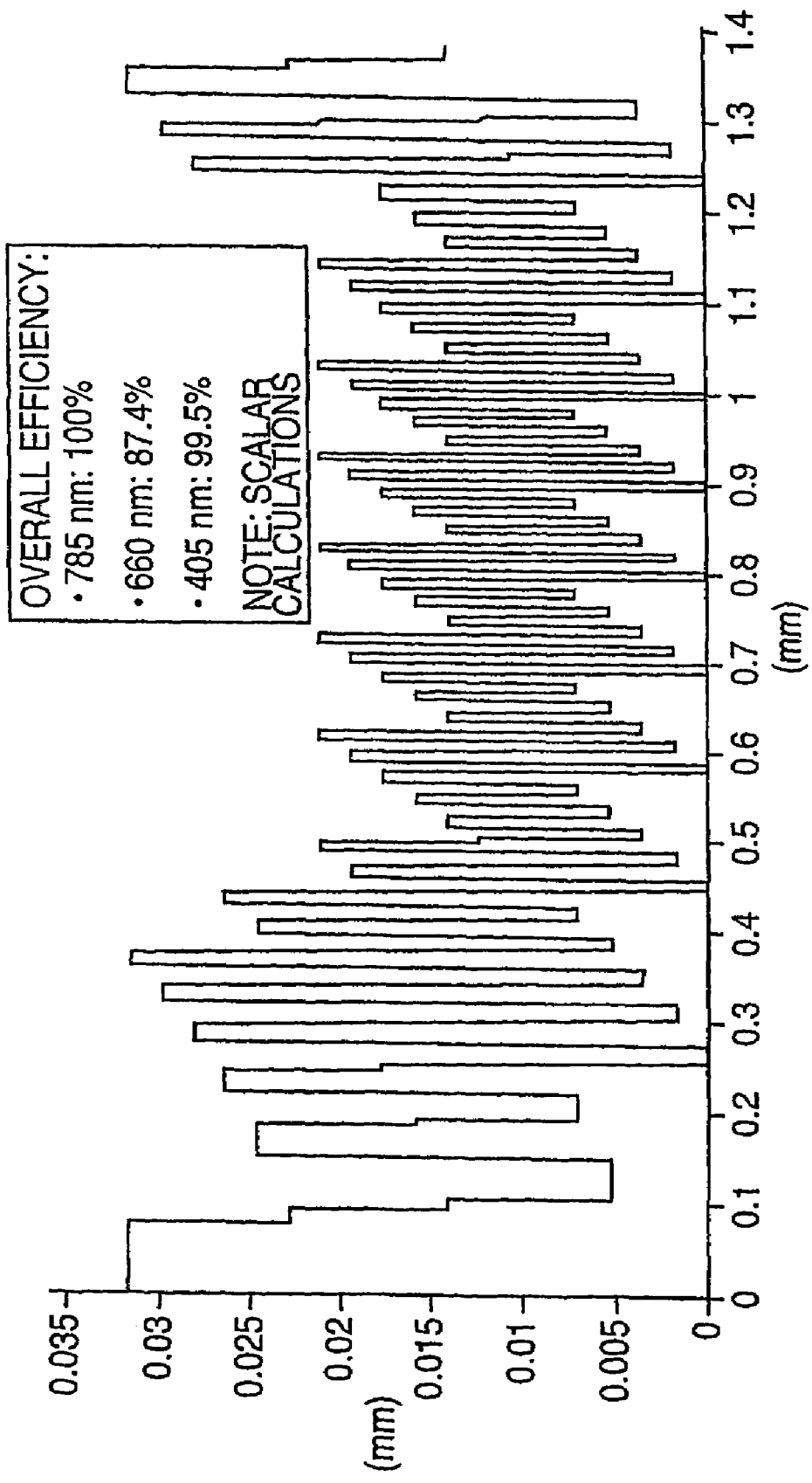
FIG. 2 is a plot of the structure of the diffractive element for red light on the fused silica side, from the center of the element outwards.

U.S. Provisional Application No. 60/608,375 filed on Sep. 13, 2004 and entitled: "Chromatic Diffractive Optical Element Corrector," is hereby is incorporated by reference herein in its entirety for all purposes.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the concept of the invention to those skilled in the art. In the drawings, the thickness of layers and regions are exaggerated for clarity. It will also be understood that when a layer is referred to as being "on" another layer or substrate, it may be directly on the other layer or substrate, or intervening layers may also be present. Further, it will be understood that when a layer is referred to as being "under" another layer, it may be directly under, or one or more intervening layers may also be present. In addition, it will also be understood that when a layer is referred to as being "between" two layers, it may be the only layer between the two layers, or one or more intervening layers may also be present. Like numbers refer to like elements throughout.

As noted above, the use of fused silica for DOE correctors does not work well for beams at 405 nm and 785 nm, since the phase delay ratio of these wavelengths in fused silica if very close to 1:2, making the only manufacturable harmonic structure practical a binary lens, which is very inefficient. Therefore, a solution that can provide a phase delay ratio between two wavelengths of interest that is not so close to a harmonic, while allowing proper diffracting of a third wavelength, is needed.

In order to address the problems of harmonic influence, a DOE corrector 5 in accordance with an embodiment of the present invention is shown in FIG. 1. The DOE corrector 5 includes a substrate 10 a first diffractive 12 in a first material providing a harmonic phase delay, i.e., so the first and third wavelengths are treated substantially equally, and a second diffractive 14 in a second material providing a non-harmonic phase delay, i.e., so that the first and third wavelengths are treated substantially differently. For example, the substrate 10 may be a harmonic phase delay material, such as fused silica, into which the first diffractive 12 is etched, and then a non-harmonic phase delay material 16 may be provided on an opposite side of the substrate 10 in which the second diffractive 14 is formed. For example, an embossable material, such as a polymer, may be used as the non-harmonic phase delay material 16, and the second diffractive 14 may be stamped into the embossable material.

Conventionally, when designing a diffractive which is to provide a high efficiency zero-th order beam for a particular wavelength, the etch depths in the diffractive are set to be $2\pi$ multiples for that wavelength, so the diffractive structure essentially does not effect light at that wavelength, i.e., the phase delay will be negligible. In accordance with the present invention, in designing the first diffractive 12 for use with the red light, the diffractive etch depths are limited to be $2\pi$ multiples of the IR light, rather than the blue light, since the IR light is practically a harmonic of the blue light. In other words, the diffractive etch depths are limited to be $4\pi$ multiples of the blue light. After determining thickness values that are close to those multiples of $4\pi$, those that also have phase values at or near fractional phase values of $2\pi$ for the red light are chosen. For example, if a sixteen phase level structure is to be provided in fused silica, then the target (modulo $2\pi$) phase values for the red light are given by:

$$2\pi * i/16 \quad (4)$$

where i varies from 0 to 15.

On the non-harmonic phase delay side, the second diffractive element is designed to provide a high efficiency first order for the IR light. The second diffractive element is designed by selecting a maximum phase error for each wavelength not to be effected by the second diffractive element, here the blue and red light. Then, all levels that are equal to integer multiples of $2\pi$, within the maximum phase error, are determined for the blue light. The maximum phase error for each wavelength may be the same. Then those levels that are not also within a maximum phase error of $2\pi$ for the red light are eliminated. Finally, the remaining levels are then selected in accordance with equation (1) for the IR light. The non-harmonic phase delay material may be $TiO_2$, SU-8, ultra-violet (UV) curable polymers, or thermally curable polymers having an appropriate dispersion.

Numerous levels satisfying the above conditions are available for creating both diffractive elements, allowing efficient DOE corrector to be created. For example, if using fused silica and only diffracting 660 nm into the first order, while 407 nm and 785 nm are substantially directed into the zero-th order, i.e., the etch depths are at $2\pi$ multiples of 785 nm, within a 20 degree error and restricting M to less than twenty, four levels satisfy these requirement, i.e., M=0, M=2, M=14 and M=16 for 407 nm. Better performance may be realized in practice by also considering etch depths that are not exact $2\pi$ multiples of blue light, e.g., within a 20 degree error as for the IR. Using this method, if the maximum etch depth of the fused silica material is nine microns, a practical diffractive optical element may be formed in the fused silica having between four and twelve levels. If the maximum etch depth of the thin film, e.g., a UV curable polymer noted above, is fifteen microns, a diffractive optical element formed therein may have between four and eight levels. Again, the limitations on the etch depth is due to shadowing and vector diffraction effects due to the aspect ratio.

A specific example of a structure for the first diffractive element is shown in FIG. 2. As can be seen therein, the period and etch depth across the diffractive element may be varied.

FIG. 3 illustrates the DOE corrector 5 of FIG. 1 aligned with a lens 24 to be corrected, when the lens 24 is roughly a sphere. The general method of alignment is disclosed in U.S. Pat. No. 6,426,829 entitled "Integrated Micro-Optical Subsystems," which is hereby incorporated be reference. As can be seen in FIG. 3, a substrate 20 is patterned and etched to form a hole 22 therein. This hole 22 receives the lens 24, which may be secured in the hole by using an adhesive 26, e.g., solder. The lens 24 may be polished to flatten a surface 25 thereof to be about even with a surface of the substrate 20, as shown in FIG. 3, or may remain in its original form. The substrate 20 is then aligned with the DOE corrector 5 and these components may be secured together, e.g., using a bonding material 30, as shown in FIG. 3. The DOE corrector 5 and the substrate 20 may be aligned and secured as a plurality of elements, e.g., on a wafer level. Then, a resultant optical element 35 may be realized by separating the wafer containing multiple resultant optical elements 35 along lines 38.

Thus, in accordance with the present invention, a DOE corrector for use with three wavelengths may be formed by providing a first diffractive element in a harmonic phase delay material and a second diffractive element in a non-harmonic phase delay material. For example, assuming the harmonic relationships between the wavelengths is two, the phase delay ratio may be less than 1.95 or greater than 2.05 in the non-harmonic phase delay material, and within these bounds for the harmonic phase delay material. The DOE corrector 5 may face either direction. While the DOE corrector 5 shown in FIG. 1 is provided on a single substrate that is embossed on one side, the DOE corrector may be realized in accordance with the present invention by securing substrates of appropriate materials together, or even separated substrates. Further, both the harmonic and non-harmonic phase delay materials may be provided on opposite sides of a substrate, or the substrate may be the non-harmonic phase delay material.

Embodiments of the present invention have been disclosed herein and, although specific terms are employed, they are used and are to be interpreted in a generic and descriptive sense only and not for purpose of limitation. For example, while a spherical lens has been illustrated, other shapes, using different alignment mechanisms, may be used. Accordingly, it will be understood by those of ordinary skill in the art that various changes in form and details may be made without departing from the spirit and scope of the present invention as set forth in the following claims.

What is claimed is:

1. A method of making a plurality of micro-optical systems, comprising:

providing a plurality of diffractive optical elements; and aligning each diffractive optical element with a refractive optical element, each micro-optical system including a refractive optical element and a diffractive optical element, the diffractive optical element providing different focal lengths at three different wavelengths for each micro-optical system and including adjacent steps within a cycle having a difference of more the $2\pi$ for at least one of the three different wavelengths.

2. The method as claimed in claim 1, wherein the plurality of diffractive optical elements are integral before aligning and then separated to form each of the micro-optical systems.

3. The method as claimed in claim 1, wherein the diffractive optical element provides a different numerical aperture for each of the three different wavelengths for each micro-optical system.

4. The method as claimed in claim 1, wherein aligning each diffractive optical element with a refractive optical element includes providing a corresponding plurality of refractive optical elements.

5. The method as claimed in claim 4, wherein the plurality of refractive optical elements are integral before aligning and then separated to form each of the micro-optical systems.

6. The method as claimed in claim 5, wherein providing the plurality of refractive optical elements includes providing a first substrate having a plurality of holes therein and placing an approximately spherical lens in each hole.

7. The method as claimed in claim 5, further comprising securing the plurality of refractive and diffractive optical elements in a direction parallel to an optical path through the micro-optical systems before separating into each of the micro-optical systems.

8. The method as claimed in claim 1, wherein providing a plurality of diffractive optical elements comprises:

providing a first diffractive element on a first surface in an optical path of each micro-optical system; and providing a second diffractive element on a second surface in the optical path of each integrated micro-optical system.

9. The method as claimed in claim 8, wherein the first surface is of a first material and the second surface is of a second material.

10. The method as claimed in claim 9, wherein second and third wavelengths have a substantially harmonic relationship, the second and third wavelengths being more harmonic in the first material and less harmonic in the second material.

11. The method as claimed in claim 9, further comprising providing the second material directly on the first material.

12. The method as claimed in claim 8, wherein the first and second surfaces are on respective substrates secured along a direction parallel to the optical path of each integrated micro-optical system.

13. The method as claimed in claim 8, wherein the first diffractive element directs a majority of light of second and third wavelengths of the three wavelengths into a zero-th order, and the second diffractive element diffracts the second wavelength, while directing a majority of light of the first and third wavelengths into a zero-th order.

14. A method of making an optical system, comprising:

providing a refractive optical element; and aligning a diffractive optical element (DOE) corrector for use with three different wavelengths with the refractive optical element, forming the DOE corrector including providing a first diffractive optical element on a first surface of a first material, the first diffractive optical element diffracting a first wavelength of the three wavelengths, while directing a majority of light of second and third wavelengths of the three wavelengths into a zero-th order, and providing a second diffractive optical element on a second surface of a second material, the second material being different from the first material, the second surface being different from and in an optical path of the first surface, the second diffractive optical element diffracting the second wavelength, while directing a majority of light of the first and third wavelengths into a zero-th order.

15. The method as claimed in claim 14, wherein each of the first and second diffractive optical elements includes a difference between phase levels of more than $2\pi$ for at least one of the three different wavelengths.

16. The method as claimed in claim 14, wherein providing the refractive optical element comprises:

providing a substrate having a hole therein; and providing the refractive optical element in the hole.

17. The method as claimed in claim 16, further comprising securing at least one of the first material, the second material and the substrate together.

18. The method as claimed in claim 14, further comprising securing the first material and the second material together.

19. The method as claimed in claim 14, wherein the second material is more dispersive than the first material.

20. The method as claimed in claim 14, wherein the second and third wavelengths have a substantially harmonic relationship, the second and third wavelengths being more harmonic in the first material and less harmonic in the second material.

21. The method as claimed in claim 14, wherein at least one of providing the refractive optical element, the first diffractive optical element and the second diffractive optical element comprises providing a plurality of optical elements integral before aligning and then separated to form each of the optical systems.

* * * * *